(12) United States Patent
Parisien et al.

(10) Patent No.: US 10,934,186 B1
(45) Date of Patent: *Mar. 2, 2021

(54) METHOD AND SYSTEM FOR CHANGING A PROPERTY OF A POLAR LIQUID

(71) Applicants: Brian Rudy Parisien, Dunrobin (CA); David Tat Fai Fung, West Vancouver (CA); Ron Vered, Ottawa (CA); James Stuart Wight, Ottawa (CA)

(72) Inventors: Brian Rudy Parisien, Dunrobin (CA); David Tat Fai Fung, West Vancouver (CA); Ron Vered, Ottawa (CA); James Stuart Wight, Ottawa (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/916,515

(22) Filed: Jun. 30, 2020

Related U.S. Application Data

(63) Continuation-in-part of application No. 16/712,289, filed on Dec. 12, 2019, now Pat. No. 10,737,956.

(51) Int. Cl.
| | |
|---|---|
| *C02F 1/48* | (2006.01) |
| *C02F 1/00* | (2006.01) |
| *H01F 7/20* | (2006.01) |
| *C02F 101/16* | (2006.01) |

(52) U.S. Cl.
CPC ............ *C02F 1/48* (2013.01); *C02F 1/008* (2013.01); *H01F 7/20* (2013.01); *C02F 2101/16* (2013.01); *C02F 2201/483* (2013.01); *C02F 2209/008* (2013.01); *C02F 2209/05* (2013.01); *C02F 2303/04* (2013.01)

(58) Field of Classification Search
CPC .......... C02F 1/481; C02F 1/487; C02F 1/484; C02F 2103/08; C02F 2201/483; C02F 2201/486
See application file for complete search history.

(56) References Cited

U.S. PATENT DOCUMENTS

| | | | | |
|---|---|---|---|---|
| 5,606,723 A | * | 2/1997 | Morse ...................... | C02F 1/48 422/186 |
| 9,682,358 B2 | | 6/2017 | Rubio | |
| 2007/0221577 A1 | | 9/2007 | Vallee ........................... | 210/695 |
| 2009/0242407 A1 | | 10/2009 | Shiga ........................... | 204/557 |

(Continued)

FOREIGN PATENT DOCUMENTS

| | | | | |
|---|---|---|---|---|
| CN | 107352628 | | 11/2017 | ............... C02F 1/48 |
| JP | 2005296796 | | 10/2005 | ............... C02F 1/48 |

(Continued)

OTHER PUBLICATIONS

AU 202000509 Examination Report dated Mar. 18, 2020.

*Primary Examiner* — Waqaas Ali
(74) *Attorney, Agent, or Firm* — Teitelbaum & Bouevitch; Neil Teitelbaum

(57) ABSTRACT

A system for treating a polar liquid includes a signal generator for providing an alternating electrical current, and a transducer electrically coupled to the signal generator. The transducer includes a solenoidal coil and two ferromagnetic end pieces at the ends of the coil and transverse thereto. In operation, the transducer is at least partially immersed in a polar liquid and, when energized with the current provides a magnetic field into the liquid, the field may change a property of the liquid, e.g. an interfacial mass transfer rate. This can be used in many different industrial applications.

25 Claims, 5 Drawing Sheets

(56) References Cited

U.S. PATENT DOCUMENTS

| | | | |
|---|---|---|---|
| 2010/0181261 A1 | 7/2010 | Taylor | 210/748.17 |
| 2010/0197992 A1 | 8/2010 | Cuppen | 600/13 |
| 2014/0113331 A1 | 4/2014 | Yancey, Jr. | 435/71.1 |
| 2014/0374236 A1 | 12/2014 | Moore et al. | 204/155 |
| 2016/0016829 A1* | 1/2016 | Hughes | C02F 1/487 |
| | | | 204/661 |
| 2018/0216246 A1 | 8/2018 | Chew et al. | 11/22 |
| 2018/0222778 A1 | 8/2018 | Chew et al. | |

FOREIGN PATENT DOCUMENTS

| | | | |
|---|---|---|---|
| WO | 9622831 | 8/1996 | B01J 19/08 |
| WO | 9622832 | 8/1996 | B01J 23/62 |
| WO | 2016115405 | 7/2016 | C02F 1/48 |

* cited by examiner

⊗ COIL LOOP, CURRENT FLOWING INTO PAGE
⊙ COIL LOOP, CURRENT FLOWING OUT OF PAGE

_US 10,934,186 B1_

METHOD AND SYSTEM FOR CHANGING A PROPERTY OF A POLAR LIQUID

CROSS-REFERENCE TO RELATED APPLICATIONS

The present application is a continuation-in-part of U.S. patent application Ser. No. 16/712,289 filed Dec. 12, 2019, which is incorporated herein by reference.

FIELD OF THE INVENTION

This disclosure relates to a system and method for providing an alternating magnetic field to a polar liquid such as water, and more particularly, for changing a property of the liquid.

BACKGROUND

Magnetic fields have been applied in various applications to polar liquids to change a property of the liquid. Polar liquids are liquids that contain polar molecules. For a molecule to be polar, it has to experience dipole moments within itself. An electrical dipole moment is caused by unequal electronegativity between atoms in a covalent bond. A water molecule by itself is polar. The term polar liquid used herein refers to a liquid that is at least partially polar such as a mixture of a polar liquid and a non-polar liquid, e.g. water and oil.

Static fields with large gradients have been used to separate particles within fluids. Magnetic fields have been used to reduce scale within pipes, and electromagnetic signals have been used in numerous applications in industry. For example, US Patent Application 20140374236 in the name of Moore et al. describes a liquid treatment device comprising: two antennae; an enclosure for holding a liquid including a solvent and a solute; a generator operatively connected to the two antennae to generate an oscillating voltage in each antenna, wherein each voltage is out of phase with the other to create an oscillating electric field; and the liquid in the enclosure being subjected to the electric field in the presence of a magnetic field to change the chemical and/or physical properties of the solute, without the liquid contacting the two antennae. This device is essentially a conductive wire wrapped around a pipe containing the fluid coupled to a signal generator. Moore et al. suggest that the magnetic field coil may be wrapped around a non-ferrous or ferrous material that is positioned close to the liquid containing enclosure but does not contact the liquid. However, devices attached to a pipe with a polar liquid, such as disclosed by Moore et al. and other prior art references, provide limited output and cannot be used for treatment of open bodies of water such as rivers and industrial ponds.

Relative to open waters, US Patent Application No. 20180216246 in the name of Chew et al. teaches immersing a coil into seawater near a metal structure so as to produce an ionic current in the seawater and thus prevent a corrosion current from leaving the surface of the metal. It is cost efficient to practice the method in the proximity to the metal target. Morse et al. in U.S. Pat. No. 5,606,723 also employ the electric field effected in the liquid; they teach a coil in an air-tight housing, with voltage probe discs attached at the ends of the coil for delivering an electric field into the solution. However, treating large open bodies of water, or any other polar liquid for that matter, remains an open problem, and new transducer devices and methods of their use need to be developed.

SUMMARY

In accordance with an aspect of this disclosure a system for providing an alternating magnetic field to a polar liquid for changing a property thereof, or for changing a biological response from biological material within the polar liquid is provided. The system comprises a first at least partially immersible (ALPIM) device comprising: a first signal generator for generating a first alternating electrical current; and, a first transducer for immersing into the polar liquid, comprising: an electrically conductive solenoidal coil electrically for coupling to the first signal generator for providing the alternating magnetic field in response to the first alternating electrical current, the electrically conductive solenoidal coil formed of a plurality of loops each having an interior, the loop interiors forming an interior of the coil, wherein the polar liquid is substantially prevented from penetrating the interior of the conductive solenoidal coil when the first transducer is immersed in the polar liquid, and two ferromagnetic end pieces one at each end of the coil transverse thereto and electrically isolated from the coil, for shaping a portion of the magnetic field external to the coil and penetrating the liquid when the system is immersed in the polar liquid and operational. The polar liquid is substantially prevented from penetrating the interior of the conductive solenoidal coil in the sense that at least 65% of the interior of the electrically conductive solenoidal coil is not accessible by the polar liquid, preferably 80% of the interior of the electrically conductive solenoidal coil is not accessible by the polar liquid, and more preferably 100% of the interior of the electrically conductive solenoidal coil is not accessible by the polar liquid.

In accordance with another aspect a system is provided comprising first and second at least partially immersible (ALPIM) devices, each comprising a signal generator for generating an alternating electrical current, and a transducer comprising an electrically conductive solenoidal coil. The system further includes a control center for controlling the first and second ALPIM devices. Each of the transducers may include two end pieces, one at each end of the coil and transverse thereto.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

Figure 1:
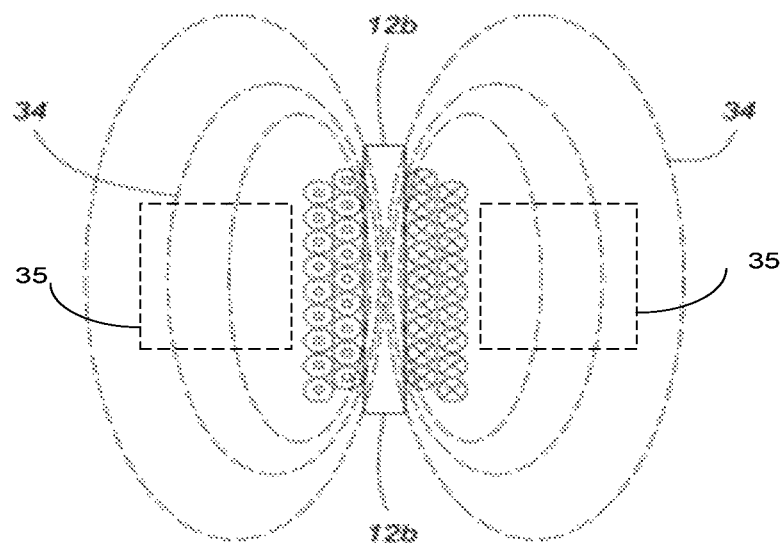
FIG. 1 is a cross-sectional view of a prior art transducer.

We have discovered that by energizing an electrically insulated conductive coil formed of loops of wire with a very small amount of alternating current of under one ampere, and preferably hundreds of microamps or less, and by placing the energized coil into a polar liquid such as water, we can generate an alternating magnetic field emanating from the coil through the insulation that will affect the polar liquid exposed to the magnetic field by changing a property of the polar liquid, such as gas exchange rate or other properties, and that the affected liquid will in turn have an effect on polar liquid a great distance away, of at least 10s of meters, through a contagion or domino effect, changing one or more properties of the polar liquid this large distance from the coil emanating the magnetic field, hereafter referred to as a transducer. The benefits of adjusting the gas transfer rate or other properties are numerous and have applicability to many industrial applications. Advantageously, the loop or coil transducer is insensitive to the conductivity of the polar liquid, and therefore insensitive to the pH of the liquid, thus allowing it to be used in many different liquids irrespective of conductivity or the electrical grounding environment in the vicinity of the treatment vessel.

Attempts have been made to provide submerged devices which emit an electric current, or electric field into water. However, we believe that the presence of an electrical current or electric field may have a deleterious effect. Due to the presence of impurities and admixes, the electric field results in an electrical current which may be hazardous or at least unpleasant for people and other creatures, and may cause corrosion and mineral buildup of structures proximate to the device. The method disclosed herein uses a magnetic field so as to affect the liquid. The electrical current in water, if induced by an immersed device, would produce a secondary magnetic field, different from the magnetic field produced by the current within the device. Our goal is to use a magnetic field without an electric field. Any electric field that might be produced by our coil transducer is unwanted and is less than 1 V/m or significantly less and negligible. The magnetic field may be created by a coil within a transducer, while the electric field produced by the transducer is ideally zero.

We have discovered that using only an alternating magnetic field, and enhancing its effect by shaping the magnetic field, we are able to change properties of a polar liquid at a distance of 40 meters and more with a very low power signal producing a low intensity alternating magnetic field. We believe that, when a properly energized transducer, with a suitable electrical signal having a suitable frequency and amplitude, is placed in a polar liquid, the resulting alternating magnetic field emanating from the coil affects the liquid in close proximity to the coil, changing the liquid's property near the coil. Surprisingly, the effect then expands through the liquid, often in a matter of minutes. The difference should be noted between the speed of the field propagation, i.e. the speed of light in the particular medium, and the speed of the liquid-changing effect which is significantly less than the speed of light. The discovered effect may be envisioned as a domino effect in molecules of the liquid: the magnetic field generated by the transducer affects molecules and/or intermolecular bonds in the liquid proximate to the transducer. What we have discovered is that when we use a signal of suitable frequency and amplitude, the affected portion of the liquid affects another portion of molecules at some distance from the transducer, and so on. The term "domino effect" refers to a linked sequence of events, while the events are not necessarily mechanical as in case of domino tiles. The effect may be referred to as a chain reaction or a contagion effect.

The disclosure provides cost-effective transducers, of a relatively small size. The transducers are capable of changing properties of a polar liquid at a distance, and several transducers may be used for treatment of large open bodies of water. The transducer also provided a change in a biological response from biological material within the polar liquid.

The transducers disclosed herein operate at very low power and have far reaching effects. By way of example, such a transducer can change the mass transfer rate of water at a significant distance from where the transducer is placed over time. In one instance surprisingly a signal of less than 1 milliWatt was able to generate an effect that was measurable 150 m away from the point of treatment in open water.

Furthermore, a relatively small coil transducer can be immerged in a body of water and it can be easily positioned or moved from one location to another. A floating apparatus comprising a signal generator and a submerged transducer has been tested with successful results.

Figure 3:
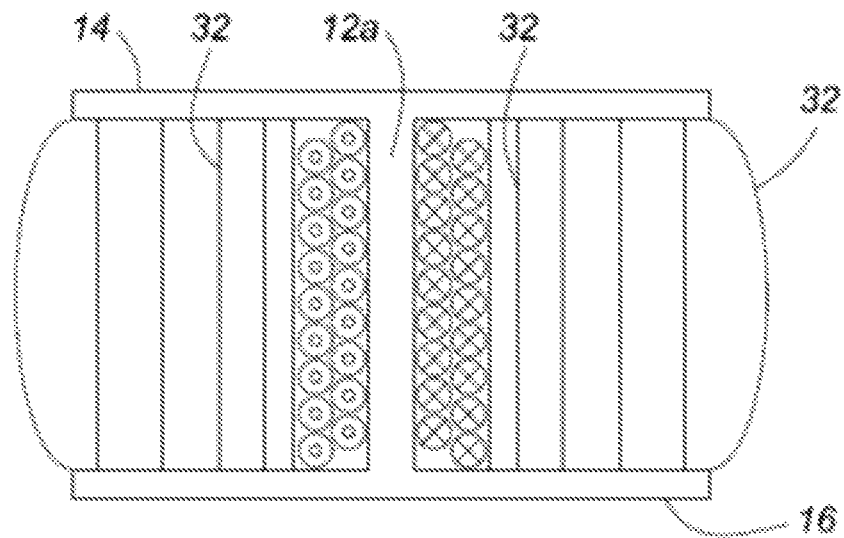
FIG. 3 is a cross sectional view of the transducer illustrating lines of magnetic flux exterior to the coil when transducer is powered.

FIG. 1 illustrates a magnetic field provided by a solenoidal (cylindrical) coil wound around a straight support 12b. Field lines 34 proximate to the solenoid are substantially parallel to each other and have same polarity. This portion 35 of substantially unidirectional (at a particular moment) magnetic field may provide a cumulative effect which changes a particular property of the polar liquid about where the coil is immersed. It is preferred that coil is a solenoidal coil, since the cylindrical elongate shape of the solenoid provides the magnetic field around the solenoid, the field almost parallel to the longitudinal axis of the solenoid in close proximity to the coil. The ends of the solenoid potentially have a deleterious effect since the polarities of the converging lines of magnetic flux oppose each other, so it is desirable to reduce or possibly exclude that effect. It is desirable to expand the space around the coil where the magnetic lines are close to being parallel to each other, so that more liquid may experience the cumulative effect of the magnetic field. In one embodiment, it is done by using a very long solenoidal coil. In a preferred embodiment, the magnetic field is shaped with the help of ferromagnetic end pieces at the ends of the coil and transverse thereto. With reference to FIG. 3, the ferromagnetic end pieces reconfigure the magnetic field outside the coil so as to expand the ring 35 (FIG. 1) where lines of magnetic flux are substantially parallel to each other.

Additionally, field lines within the support 12b have a different polarity. Thus, if the liquid has access to the interior of the coil, the cumulative effect will be negated. Accordingly, it is desirable to prevent the liquid from being affected by the opposite direction of the magnetic field. This may be achieved by preventing the liquid from entering the interior of the coil, e.g. placing a ferromagnetic core or any kind of support or fill within the interior of the coil, or by placing the coil within a container that prevents liquid from entering the interior region of the coil or the polar regions; however the magnetic field must be able to pass through the container. A ferromagnetic core has the effect of increasing the magnetic flux density as well as preventing the fluid from entering the interior of the coil. Any non-ferromagnetic body placed in the interior of the coil preferably extends beyond the ends of the coil so as to prevent access of the liquid to the most concentrated opposing polarities at the magnetic poles.

Experiments have been conducted where a transducer was designed so as to increase the effect of a unidirectional portion of the magnetic field, while preventing another portion of the field, of the opposite polarity, from penetrating the liquid, at each particular moment. The unidirectional portion 35 of the magnetic field is understood as a spatial volume containing a portion of the magnetic field produced by the coil, wherein field lines within the volume are substantially parallel to each other at a particular moment, while may have the opposite direction at another moment.

Figure 2:
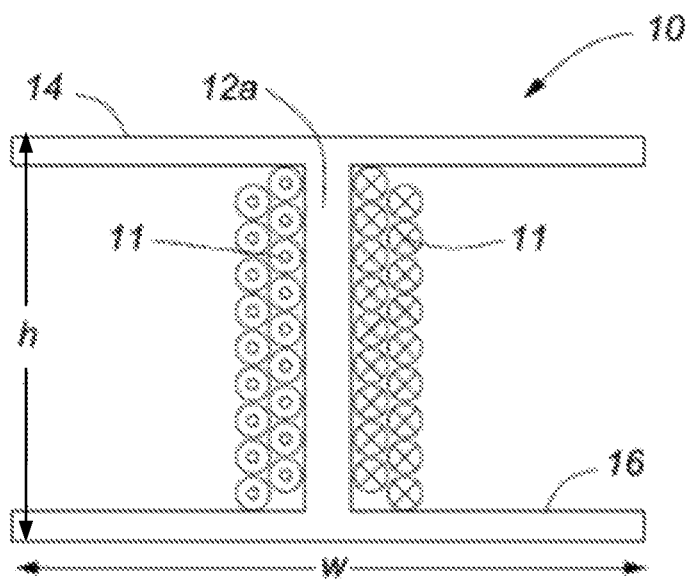
FIG. 2 is a cross-sectional view of a transducer.

FIG. 2 illustrates an exemplary embodiment. A transducer 10 has a solenoidal coil 11 of electrically insulated wire wrapped around the core 12a. Here and elsewhere in the drawings, a circle with a cross indicates a cross section of a coil loop wherein a current flows into the plane of the drawing, while a double circle indicates a cross section of a coil loop wherein the current flows out of the plane of the drawing. The insulation of the wire allows a magnetic field to pass therethrough. The two ends of the coil are electrically coupled to two terminals of a signal generator (not shown), so that the alternating current can flow through the coil 11 from the signal generator and back to the signal generator. In operation an alternating electrical current in the form of a 2.5 kHz sine wave is provided to the coil 11. The root mean square (rms) of the alternating current amplitude is 133 micro amps. As is well understood, a magnetic field is generated emanating from and external to the coil 11. The transducer 10 has a core 12a made of a ferromagnetic material, for example, mild steel or stainless steel. Integral with the core are planar end pieces 14 and 16, also made of mild steel or stainless steel or other alloys, with the relative permeability of from 100 to 5000 and possibly more. The height of the core 12a is h=3.5 cm, and the diameter (max dimension) of the end pieces is W=5 cm.

FIG. 3 illustrates the magnetic lines of flux 32, which are substantially parallel due to the elongate, substantially straight shape of the core and due to the field-shaping effect of the end pieces 14 and 16 extending normally to the core. Unconstrained, the core 12b absent the polar end pieces, the magnetic lines of flux 34 are not parallel as is shown in FIG. 1. To achieve a greater effect on the liquid that the transducer is placed in, it is preferred to have substantially parallel lines of flux. The end caps 14 and 16, on the poles of the core 12a of the transducer 10 (FIGS. 2 and 3) concentrate the magnetic lines of flux 32 so that the lines of flux external to the coil 11 and core 12a are almost parallel.

Figure 4:
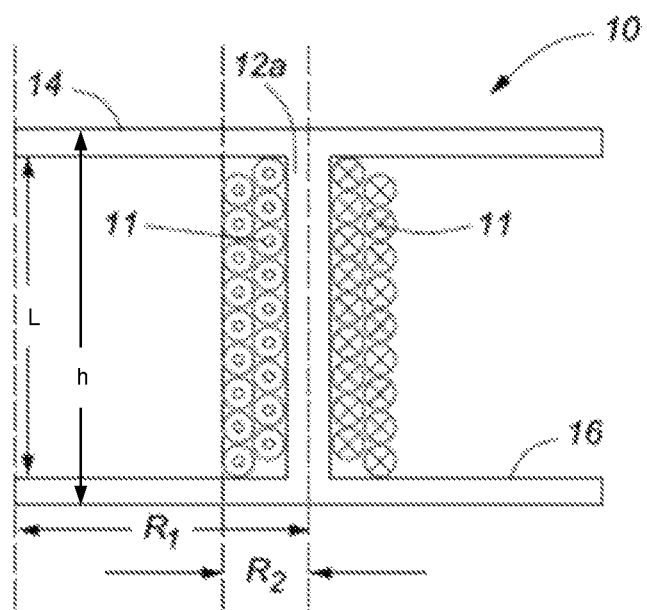
FIG. 4 is a cross-sectional view of the transducer.

Turning now to FIG. 4, the transducer 10 is shown to have a height h and radius $R_1$. Radius $R_2$ defines the radius from the center of the metal core 12a to the outside of the coil 11 having N turns. By way of example, the height of the coil L=3 cm, h=3.5 cm, $R_1$=2.5 cm, $R_2$=0.8 cm, N=44 turns of 22 gauge single strand insulated wire. The core was made of mild steel.

Experiments have been performed with said transducer so as to observe the impact of exposure of water to magnetic fields as described herein, on mass transfer rate across the air water interface of bubbles. Several frequency and current pairs have been found to provide better results than others, in particular, in achieving noticeable change a property of a polar liquid at a distance of at least 10 meters: 2500 Hz at the current of 0.100 mA, 2700 Hz at the current of 0.099 mA, and 4000 Hz at the current of 0.140 mA. The search for preferable parameters was based on theoretical hypotheses of how the technology worked, and included adjusting parameters while the effect has been measured. More such parameters may be found by experimentation. It is expected that the advantageous effect, though possibly slightly reduced, may be achieved for frequency and current deviating from the particular preferable parameters by ±10 Hz and ±15 micro Amperes, respectively. The same parameters may be advantageously used with other transducers. It should be appreciated that the parameters of the magnetic field and the required electrical signal may vary depending on the liquid, e.g. the level and nature of contamination in water. The geometry of the vessel or water body may also affect the parameters needed to achieve the desired effect.

For the embodiment shown in FIGS. 2 through 4, we have demonstrated that preventing a portion of the magnetic field interior to the coil 11 from contacting the fluid, the other portion of the magnetic field, the portion exterior to the coil 11, is able to noticeably and effectively change a property of the liquid it is submerged in. Thus either blocking the inside magnetic field or preventing the liquid from accessing the magnetic field within the interior of the coil allows the field exterior to the coil 11 to significantly change a property of the liquid. The suggested transducer design ensures that magnetic fields in these different regions do not simultaneously pass through the polar liquid or they would have a deleterious effect on each other not producing a desired change in a property of the polar liquid. Preferably the magnetic field interior to the coil of FIG. 2 is totally or substantially prevented from propagating through the liquid; in a less preferred embodiment at least 75% of the magnetic field interior to the coil 11 is prevented from penetrating the polar liquid. Relative to the portion of the magnetic field exterior to the coil, it is desirable that at least 10%, preferably 50%, and more preferably 75% of the magnetic field external to the coil, i.e. excluding the space occupied by the coil itself and its interior, and emanating from the coil, penetrate the liquid. We have discovered that water entering the interior of the coil has a deleterious effect, and that completely blocking water from being affected by the magnetic field within the interior of the coil gave us excellent and surprising results. We believe that the opening (interior) of the coil should be blocked by at least 65%, better still by 80%, and ideally 100%.

FIGS. 2 through 4 show embodiments where a property such as interfacial mass transfer rate or other properties of the polar liquid can be changed if the transducer is provided with an alternating signal of about 2.5 kHz and having a current of about 133 microamperes. Of course, the embodiments are not limited to this frequency or current, as these are just exemplary values that provided surprisingly favorable results. We believe that frequencies between 100 Hz and 20 kHz will produce a change in a property of a polar liquid, with a preferable interval of frequencies between 1 kHz and 5 kHz.

Figure 5:
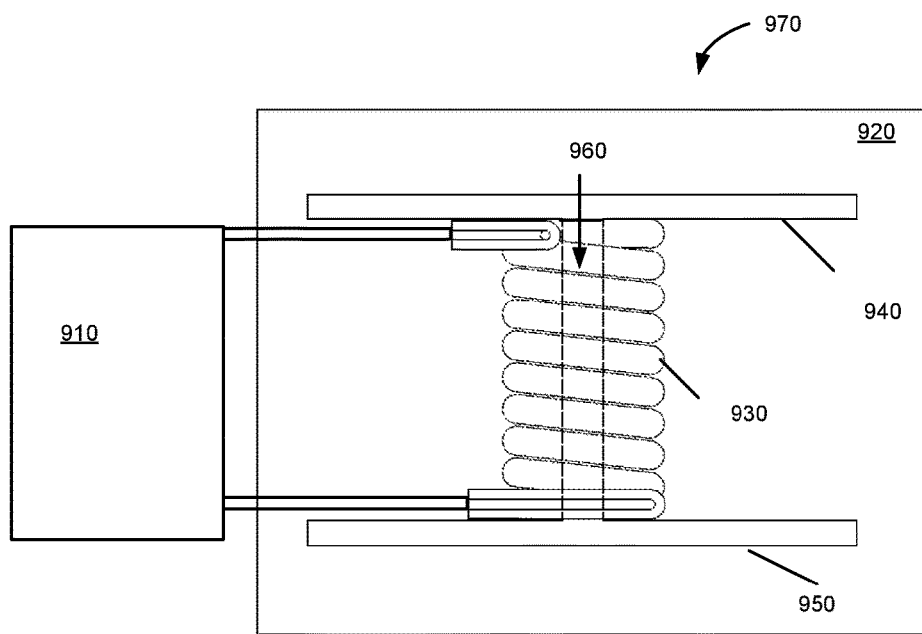
FIG. 5 is an illustration of a system for treating a polar liquid with a magnetic field.

The aforedescribed transducers may be used in a system for changing a property of a polar liquid with a magnetic field. With reference to FIG. 5, the system includes a signal generator 910 for generating an alternating electrical signal, and at least one transducer 920, which has an electrically conductive coil 930 with an insulation which electrically insulates one loop of the coil from one another, though allows a magnetic field to pass through. No electrical current is imparted from the device to the polar fluid.

The coil 930 is coupled to the signal generator 910, so that the generator 910 can provide an alternating electrical current to the coil 930, and so providing magnetic field about the coil 930.

Preferably, the coil 930 is a solenoidal coil, i.e. a cylinder in the sense that it has a straight central axis and all cross sections normal to the axis have a same shape, though not necessarily a circle. By way of example, the core 12a (FIG. 3) may be a steel bar with a square cross-section. The wire wound around such a core forms a cylinder wherein a cross section resembles a square with rounded corners. The height of the cylinder may be in the range of from 3 cm to 50 cm, though coils longer than 10 meters may also be used in other applications.

The coil is formed of loops of a conductive metal, such as a copper wire, and is electrically isolated, e.g. covered with a jacket. The wire is shaped as a coil, possibly wrapped around a straight support, thus forming multiple loops. The number of loops may be in the range of from 20 to 2000 and exceed 5000 in some applications. Each loop has an interior, and a stack of loop interiors forms an interior 960 of the coil 930, wherein a support or core may be disposed.

The coil interior 960 is protected from the liquid when the transducer is immersed therein so that a portion of the magnetic field internal to the coil 930 is substantially prevented from penetrating the liquid. The interior 960 of the coil 930 may be filled with some material as discussed elsewhere herein, or sealed. While FIG. 5 shows the coil 930 as having a single layer of wire, the coil 930 may be formed of one, two, or more layers of wire, a next layer looped around a previous layer. FIG. 2 illustrates an embodiment of the transducer described with reference to FIG. 5, wherein the coil 11 has two layers of wire.

The transducer 920 has two end pieces 940 and 950 for shaping a portion of the magnetic field external to the coil 930 thereby causing it to penetrate the liquid. The end pieces 940 and 950 are disposed at the ends of the coil 930 transverse thereto, preferably normally, so that the force lines of the magnetic field between the end pieces are substantially parallel to the central axis of the coil 930. The end pieces 940 and 950 are electrically isolated from the coil. Each of the end pieces 940 and 950 is made of one or more magnetically permeable materials with relative permeability of at least 100 times higher than relative permeability of the polar liquid under the treatment, preferably of a ferromagnetic material such as mild steel or stainless steel or other alloys, with the relative permeability of from 100 to 5000 and possibly more. The end pieces may be coated with a suitable material to prevent corrosion. The end pieces 940 and 950 may be planar and normal to the coil. They may be round and centered at the coil. The diameters (max measurement) of the end pieces are preferably at least half of the height of the coil which, in turn, may be 3 cm≤L≤50 cm.

The interior 960 of the coil 930 may be filled with any material or sealed so as to ensure that the liquid is substantially prevented from entering the interior of the coil and, thus, is not affected by a portion of the magnetic field within the interior of the coil. Ideally 100% of liquid is prevented from entering the interior of the coil. Less preferably, 80% and less preferably 65% is prevented. In other words, preferably the entire interior of the coil is not accessible by the polar liquid and, less preferably, at least 80% of the coil interior is not accessible by the polar liquid. Ideally, the interior of the coil is totally blocked so as to prevent the polar liquid accessing the coil interior. In one embodiment, the interior 960 of the coil is filled with one or more non-ferromagnetic materials, i.e. materials with relative magnetic permeability less than or equal to 1 H/m. The core may be coated with a suitable material to prevent corrosion in the liquid.

In one embodiment, the interior 960 of the coil 930 is sealed e.g. by placing the coil into a container which allows the magnetic field to pass therethrough, so that the interior 960 is not accessible by the liquid when the transducer 920 is at least partially immersed thereto. The end pieces 940 and 950 may be outside of the container so that the liquid can be affected by a portion of the magnetic field between the end pieces. In one embodiment, the coil interior is only partially sealed, while the opening is not in contact with the liquid, e.g. the transducer 920 is disposed at the surface of the liquid.

In one embodiment, the interior of the coil is filled with air or another gas, or a mixture of gases, which may support the device at the surface of the liquid. In another embodiment the interior of the coil is under a vacuum and is properly sealed.

In one embodiment, the interior 960 of the coil 930 may contain a straight core formed of a material suitable for the end pieces 940 and 950, preferably a ferromagnetic material for increasing the magnetic flux density produced by the coil. The end pieces 940 and 950 may be coupled to the core, or integral therewith as illustrated in FIG. 2 wherein the transducer 10 is an embodiment of the transducer 920. However, it is not necessary for the end pieces 940 and 950 to contact the core, though they should be disposed at the ends of the coil, in close proximity thereto and, preferably, in contact with the core. In one embodiment, the core and the end pieces are electrically isolated from the liquid.

Figure 7:
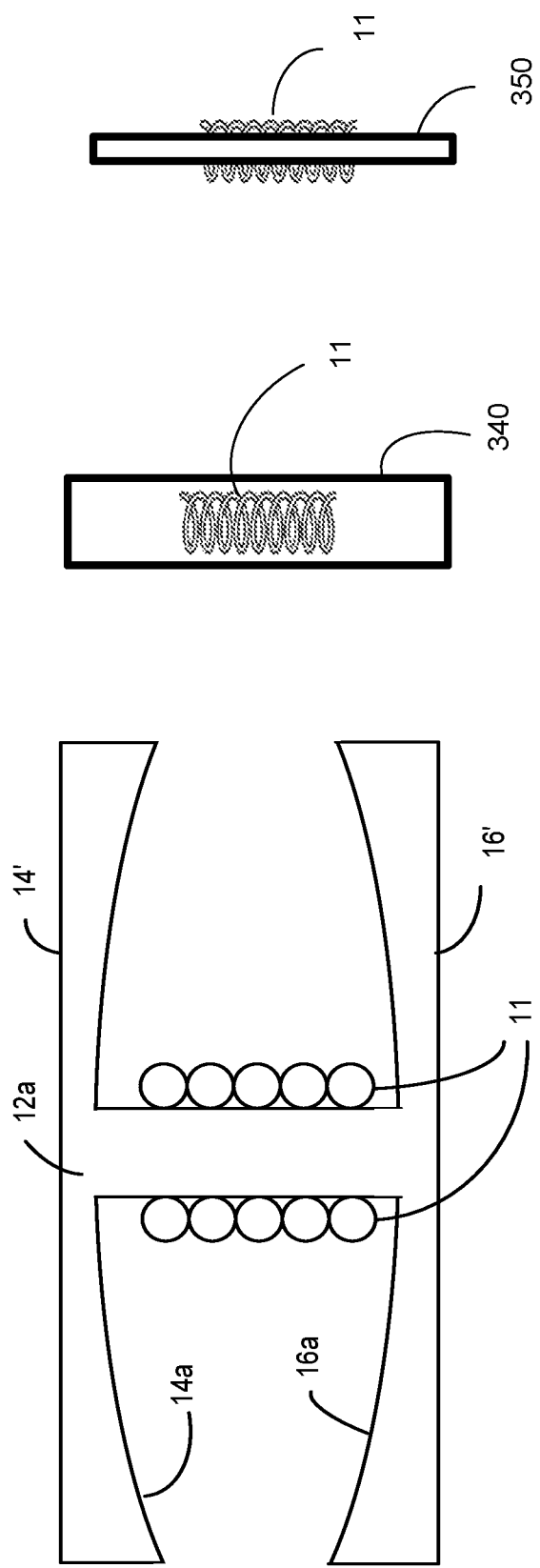
FIG. 7 is an illustration of three embodiments of a transducer.

In an embodiment illustrated in FIG. 7, surfaces 14a and 16a of the end pieces 14' and 16' may be referred to as internal surfaces, in the sense that each of them faces another end piece. The internal surfaces 14a and 16a are sloped or curved so that they are farther from one another at the coil and closer to one another away from the coil. The purpose of such an arrangement is to shape a portion of the magnetic field external to the coil, so as to expand the spatial portion 35 (FIG. 1) around the coil 11, where the field lines 34 are substantially parallel each other.

In one embodiment, the solenoidal coil is sealed within a water-tight container 340 (FIG. 7) fitting close along the coil and extending significantly beyond the ends of the coil, by at least 1 or 5%, preferably by 10% and, more preferably, by at least 20% of a height of the coil, so as to prevent the liquid from entering the interior of the coil and the polar portions of the magnetic field. In yet another embodiment, the coil has a non-magnetic core 350 extending significantly beyond the ends of the coil, by at least 1 or 5%, preferably by 10% and, more preferably, by at least 20% of a height of the coil, for the same purpose. Of course, the transducer may be only partially immersed in the polar liquid. The last two embodiments may include end pieces as described in this disclosure.

The signal generator 910 (FIG. 5) may be configured for providing a periodic electrical current with a predetermined amplitude and frequency. The current is preferably less than 3 amperes, more preferably less than 500 mA, and more preferably less than 50 mA. A feedback loop may be used to control the electrical signal in dependence upon a measured parameter, which may be, but not limited to, a value of gas exchange rate, surface tension, viscosity, freezing point temperature, or partial vapor pressure. The signal generator 910 may be capable of providing a plurality of predetermined frequencies or a predefined range of frequencies, and the system may utilize a frequency determined to be optimum from the plurality of frequencies. A measuring instrument capable of measuring a parameter, such as a value of gas exchange rate, surface tension, viscosity, freezing point temperature, or partial vapor pressure, can be connected to a feedback circuit that can be used to adjust the frequency and amplitude of the signal provided to the transducer to optimize or enhance a process that requires a change in property of the polar liquid.

In particular, the signal generator 910 may be configured to work in at least one of the following modes experimentally found to provide advantageous results: 2500 Hz at the current of 0.100 mA, 2700 Hz at the current of 0.099 mA, and 4000 Hz at the current of 0.140 mA. It is expected that almost the advantageous effect may be achieved for frequency and current deviating from the particular optimal parameters by +/−10 Hz and +/−15 uA, respectively, while the effect may be reduced to about 63% of the peak effectiveness.

The transducer 920 and the signal generator 910 may be part of an ALPIM device 970 intended to be at least partially immersed in an industrial pond, river, ocean, etc. Preferably, the signal generator and the transducer are housed separately and connected by a pair of wires or a coaxial cable. In one embodiment, the coil is at least partially immersed in the liquid, while the signal generator is not immersed—it may reside on a raft whereto the coil is attached. In another embodiment, the signal generator is at least partially immersed in the liquid. Then the interior of the device 920 provides an electrically isolated space in which to house the electronics required to operate the device. In one embodiment, the ALPIM device includes floating means, such as foam flotation ballast. In one embodiment flotation is provided by trapping air or foam in the sealed container wherein the electronics are kept. Foam helps to avoid the diurnal expansion and contraction of the air with the accompanying condensation of moisture inside the electronic housing. A metallic strip through the foam may be used to permit the transmission of heat generated by the electronic circuit. The ALPIM device 970 may have an antenna for wireless communication with a control center or other transducers, and/or a GPS receiver. A person skilled in the art would appreciate that features of different embodiments may be combined if they are not mutually exclusive.

Figure 8:
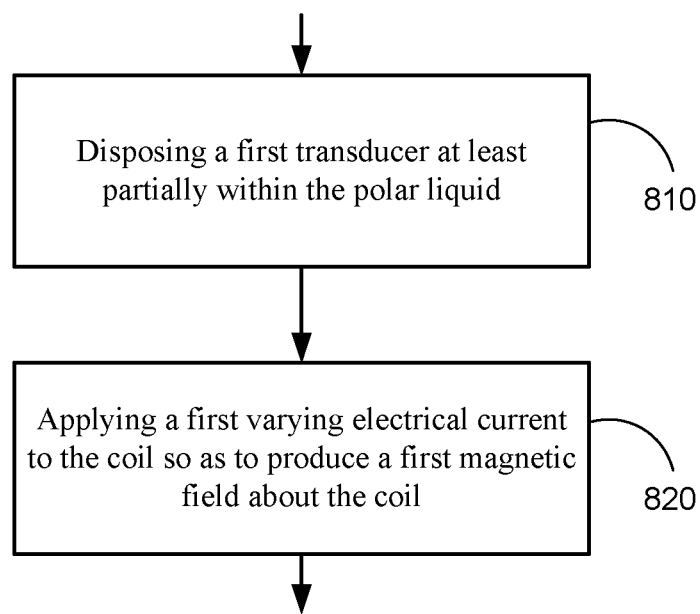
FIG. 8 is a flow chart of the method.

In operation, one or more transducers may be used for providing a magnetic field to a polar liquid so as to change a property thereof. With reference to FIG. 8, the method includes the following steps: (A) disposing a first transducer at least partially within the polar liquid, wherein the transducer includes a first electrically conductive solenoidal coil formed of a plurality of loops each having an interior, the loop interiors forming an interior of the coil, wherein the interior of the coil is filled, sealed, or opens out of the liquid so as to prevent the polar liquid from outside the coil from penetrating the interior of the coil, and (B) applying a first alternating electrical current to the coil so as to produce a first magnetic field about the coil, the field having a portion internal to the coil and a portion external to the coil, the external portion penetrating the polar liquid. The first alternating electrical current has a first frequency and a first amplitude such that the external portion of the first magnetic field has an effect on the polar liquid thereby changing the property of the polar liquid at a distance of at least 5 meters from the first transducer, preferably 10 meters from the first transducer, and more preferably, the distance is at least 40 meters, and even more preferably the distance is at least 150 meters. We believe that the effect produced by the magnetic field is the domino effect discussed above. Preferably, the transducer produces no electric field outside thereof greater than 1 V/m. Even a very small electric field that may be produced by the coil is unwanted. FIG. 8 illustrates a flowchart of the method, wherein method steps 810 and 820 may be performed in any order, including concurrent execution.

The property of the polar liquid is an intrinsic property, such as viscosity, surface tension, equilibrium partial pressure in the gas phase of the polar liquid, maximum dissolved gas saturation concentration for a particular gas, heat of vaporization, a freezing point, or a boiling point of the polar liquid. The advantages of the method have been demonstrated for such properties as gas exchange rate through the interfacial film at the surface of the liquid and that of gas bubbles in the liquid. The inventors believe that other properties of a polar liquid may be controlled using magnetic field as described herein. The value of the change in a particular property of the liquid depends on the nature of the property and physical mechanisms involved. In particular, at the distance of 5 meters from the transducer, the gas exchange rate of the polar liquid changes by at least 5%, the surface tension of the polar liquid changes by at least 1%, the viscosity of the polar liquid changes by at least 0.5%, the freezing point temperature of the polar liquid changes by at least 0.1 degree C., or the partial vapor pressure of the polar liquid changes by at least 1%.

The time necessary for the change to become detectable depends on the distance from the transducer. In our experiments, changes in an interfacial mass transfer rate were noticeable after 2 min at 10 meters, were unmistakable after 6 min, and continued to grow after 96 hrs. The impact was also measurable at 150 m within 24 hrs. In general, a property of the polar liquid changes at the distance of 5 meters within 10 minutes.

The alternating electrical current may have a sinusoidal profile, a trapezoidal profile, a triangular profile, etc. The frequency and amplitude of the electrical current used in the transducer depend on the particular liquid and, possibly, on the property desired to be changed. Our experiments show that some frequencies produce the change greater and/or faster than other frequencies. The found parameters are provided herein. When such parameters are not known, the system may be configured to perform a sweep through a range of frequencies, staying at a particular frequency for a predetermined interval of time, while the property of the liquid is monitored. In general, the frequency of the electrical current used to energize the transducer is greater than 100 Hz and less than 5000 Hz, and a root mean square of the amplitude is less than 3 amperes, preferably less than 500 mA, and more preferably less than 50 mA.

It should be understood that the method disclosed herein is practicable by simply using a coil having a plurality of turns without having a core 12a, when the interior of the coil is empty but inaccessible to the liquid, e.g. sealed. In another embodiment, a magnetically permeable core is provided. Alternatively, the core can be a plastic spool for example used to form the many turns of wire resulting in the coil. The spool may be another material, which does not deleteriously affect the transducer's performance, or there may be no spool or core present and the liquid may be prevented from entering the interior of the coil by other means.

FIGS. 2 through 4 illustrate transducers whereby a property such as an interfacial mass transfer rate or other properties of a polar liquid can be changed if the transducer is provided with an alternating signal e.g. of about 2.5 kHz and having a current of about 133 microamperes. Of course, the method is not limited to this frequency or current, as these are just exemplary embodiments that provided surprisingly favourable results. We believe that frequencies between 100 Hz and 20 kHz will produce a change in a property of a polar liquid, with a preferable interval of frequencies between 1 kHz and 5 kHz.

Figure 6:
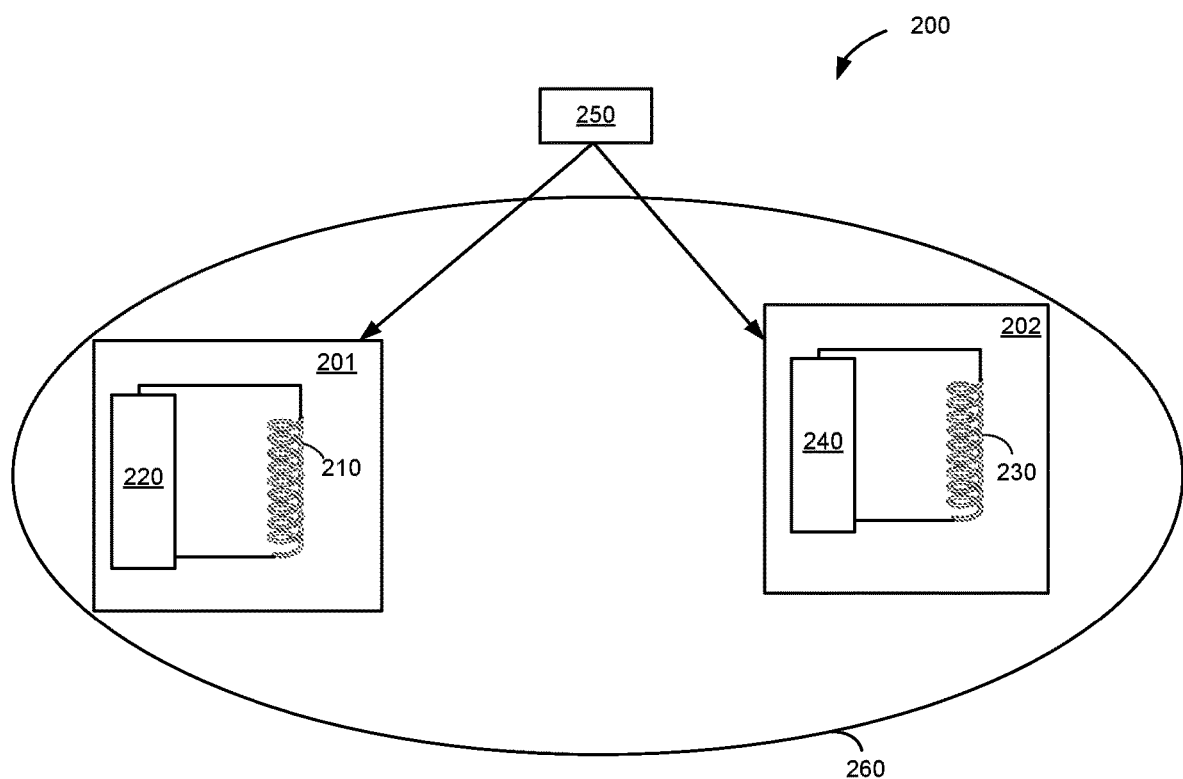
FIG. 6 is an illustration of a multi-transducer system.

With reference to FIG. 6, the aforedescribed transducers may be used in a multi-transducer system 200. The system includes at least two transducers 210 and 230 and a control center 250. Each of the transducers includes a coil for generating magnetic field when provided with an alternating electrical current. Preferably, the transducers are cylindrical coils and include end pieces as described above. However, other transducers may be used under control of the control center 250. Preferably, each of the transducers is electrically connected to its own signal generator. As shown in FIG. 6, a first signal generator 220 provides an alternating electrical current to the first transducer 210, and a second signal generator 240—to the second transducer 230. In another embodiment, one signal generator provides an electrical current to two or more transducers.

Turning back to FIG. 6, the transducers may be placed in a vessel or an open body of water or sludge, etc., 260. By way of example, ALPIM devices 201 and 202, each incorporating a transducer and preferably a signal generator, may be paced at a distance D (20 cm≤D≤300 m) from one another at least partially immersed in an industrial pond, river, lake or ocean. The control center 250 may be located ashore or elsewhere and communicate with the devices 201 and 202 over any communication protocol, preferably wirelessly. In one embodiment, multiple transducers may be deployed without a controller.

We have discovered that by placing two transducers, for example, two coil transducers, within a polar liquid or body of water, different effects can be obtained depending upon how the two transducers are operated. This provides a convenient way, in which a desired property of the polar liquid may be controlled, such as viscosity, surface tension, equilibrium partial pressure in the gas phase, maximum dissolved gas saturation concentrations, heat of vaporization, and freezing or boiling point of the polar liquid.

Two or more transducers may be used together and controlled from a same control center, wherein frequencies of the electrical current in the transducers are same and the first and second alternating electrical currents are in phase, having a zero degree phase relationship for increasing the change in the polar liquid. We have discovered that by using two transducers 10 provided with a same frequency alternating signal and wherein the signals are in phase, interfacial mass transfer rate was increased further than the increase provided by a single transducer. By way of example, a 16% increase in interfacial mass transfer rate provided by a single transducer was further increased to 20% when a second transducer having the same frequency and in phase was introduced; the transducers should be spaced apart a suitable distance to maximize a desired effect. For example, a plurality of transducers can be spaced along a water body such as a channel in order to change the freezing temperature of the water in the regions of the channel about which the transducers are placed. Adjusting the phase between the two signals provided to two transducers so that the two signals were out of phase, that is, offset or skewed in phase by varying amounts attenuated the desired effect. The property change lessened down to close to or about zero, in this instance the transducers having little or no effect. Notwithstanding, since skewing the phase attenuated the desired effect, tuning in manner by adjusting the phase by small offsets (gradually) is a way in which control of the desired effect can be achieved. For example a 20% increase in interfacial mass transfer rate achieved with two transducers having signals in phase, could be lessened for example to 10% by skewing the phase accordingly. In one embodiment, the system includes two and more transducers and means for providing a gradual change in a difference between the frequency of a current provided to a first transducer and the frequency of a current provided to a second transducer, for controlling the effect induced in the polar liquid by the magnetic field of the transducers. The phase change means may be implemented in a circuit and/or software, and may be disposed in a control center.

Furthermore, two or more transducers may be used together and controlled from a same control center, wherein frequencies of the electrical current in the transducers differ from one another, for changing the property of the polar liquid oppositely to the change caused by one transducer alone. The opposite changes are understood as opposite with respect to a baseline of the property when the liquid has not been treated by a magnetic field. The baseline is the natural state of the liquid before the transducer(s) are turned on and affect the liquid in any manner. By way of example, one transducer may increase a particular parameter measuring a property of the liquid above the baseline characterizing the untreated liquid, while two transducers with offset frequencies will decrease the same parameter below the baseline.

We have discovered that a difference in frequency between two transducers by even 1 Hz changed the effect on the polar liquid, decreasing interfacial mass transfer rate below that of untreated polar liquid rather than increasing interfacial mass transfer rate. Interfacial mass transfer rate is one of many properties that can be changed. The same effect was found with a 5 Hz offset in frequency. If we offset the phase gradually, the effect is attenuated more and more all the way down to zero. This is important as it allows us to control the intensity of the effect.

Advantageously, the system disclosed herein can be placed within any liquid that will accommodate it. It can be scaled up, or down in size as required. Different industrial applications may dictate different depth of placement of our device. In most open water bodies the remediation effort is driven by the oxygen transfer on the surface of the water body. Placing one or more transducers near the water surface with a floating device to accommodate a fluctuating water level is the preferred embodiment. In contrast prior art systems which require being external to a pipe or conduit in which water flows, requires a pipe that will allow a magnetic field to penetrate and flow through without significantly affecting the field. Furthermore, such systems cannot easily be moved from one location to another. Once fixed to a pipe it typically remains in place.

A method for separating a polar and non-polar liquid in an emulsion hereof may include: introducing the emulsion into a mixing chamber and placing a first transducer and a second transducer in contact with the polar/non-polar emulsion; applying a selected signal at a chosen amplitude and frequency to the first transducer and a selected signal which is at least 1 Hz different than that for the first transducer to the second transducer such that the transducers provide two slightly misaligned-frequency signals and magnetic fields to the emulsion for producing a change in water surface tension. The resulting corresponding higher oil/water interfacial tension will favor the coalescence of colliding non-polar liquid droplets in the polar and non-polar liquids under mild mixing conditions. The mild mixing conditions may be generated by a mechanical mixer in a vessel equipped with mechanical buffers or a section of piping equipped with a mixing valve to generate a chamber/piping Reynolds Number of 5-50. It is desirable to generate a chamber/piping Reynolds Number of 10-30 in accordance with the inverse of the concentration of the non-polar liquid in the polar liquid. The chamber Reynolds Number should be adjusted higher for a lower concentration of non-polar liquid in the polar liquid. The chamber Reynolds Number should be adjusted lower for a higher concentration of non-polar liquids in a polar liquid. The same set of principles would apply for a polar liquid in a non-polar liquid. Preferably, the residence time in the mixing chamber is 1-30 minutes. The residence time is defined as the effective Chamber volume over the emulsion flow rate. The above descriptions are two of many mechanical arrangements which may be employed to achieve the specific mixing conditions specified herein. The mixed emulsion exiting the mixing chamber enters a conventional industrial separator for polar/non-polar emulsions for the next stage of processing to achieve the targeted accelerated separation of the polar and non-polar liquids.

In operation, the transducer may be at least partially submerged in a polar liquid that is used in the manufacturing of a product or for washing a product. The application of the alternating electrical current may lessen the drying time of the product. In another embodiment, the polar liquid is an emulsion and the application of the alternating electrical current assists in separating at least a portion of the emulsion.

The transducer described heretofore or a plurality of such transducers, spaced apart and in various modes of operation, may be used for altering water conditions in a water body by increasing levels of dissolved oxygen and increasing oxidation-reduction potential (ORP) in the presence of a low intensity magnetic field to favour the growth of aerobic bacteria and added diatoms as a means of suppressing residual ammonia concentration and the growth of cyanobacteria and the like.

The overabundance of cyanobacteria in stagnant waters, as a result of the eutrophication of water, is a worldwide problem, especially because of the fact that vegetative secretions of cyanobacteria can be toxic.

Currently, cyanobacteria in stagnant waters of lakes and dams are disposed of by means of biomechanical equipment using float structures, built on the principles of biological reduction of phosphorus and nitrogen in water by cultivating special aquatic plants. The disadvantages of these devices are low efficiency, requirement of taking care of plant growth and limitations due to the vegetation period of plants.

Accordingly, the disclosure provides a viable, cost effective system and method for significantly reducing the presence of residual ammonia, and cyanobacteria commonly known as blue-green algae, from large bodies of water where it is present. Seeding bodies of water with diatoms had been found to lessen the presence of blue-green algal blooms or red-tide algal blooms. However this treatment alone has not been found to be always reliable and effective enough.

A method in accordance with this disclosure is provided for lessening the presence of residual ammonia and/or blue-green algae comprising: seeding a body of water with a population of diatoms; adding small amounts of nitrates and micronutrients if warranted by the chemical make-up of the water body, and, changing an aspect of the body of water by submerging a transducer into the water and providing a magnetic field within the body of water so that the diatoms and the nitrification bacteria in the water are "activated" in the presence of a high ORP and more dissolved oxygen than would otherwise be present in the absence of the provided magnetic field.

A surprising unexpected aspect of the method disclosed herein is that a very low intensity alternating electrical signal can affect the amount of dissolved oxygen, ORP (oxidation reduction potential) and other physicochemical properties of the water and as a result the growth of diatoms and nitrification bacteria at least 5 meters, and more preferably 50 meters from the source of the signal. We believe this effect is a function of the domino phenomenon described heretofore, whereby certain properties of water molecules subjected to a magnetic field are changed, affecting other nearby molecules and this repeated for considerable distance.

A diatom is a single-celled alga that has a cell wall of silica. Diatoms can assimilate both ammonia and nitrates in their growth. Unlike cyanobacteria, which do not have an internal membrane, nitrates can migrate through the cell membrane of diatoms and be reduced to ammonia inside the diatoms before being converted into amino acids for the growth of the diatoms and their reproduction through cell splitting. On the other hand, the presence of ammonium ions in the water is necessary for the germination of spores and heterocysts of cyanobacteria. The competition for the ammonia in the water by blue-green algae and diatoms may also be influenced by the nitrogen-phosphorous (N:P) ratio in the water.

Published studies have shown the competitive uptake of ammonia and nitrates by diatoms, cyanobacteria (blue-green algae) and chlorophylls (green algae). Diatoms, especially the species consisting of combinations of *Cyclotella meneghiniana, Synedra ulna* and various species of *Nitzschia* have high rates of uptake of nitrates when biological oxygen demand (BOD) exceeds 5 ppm.

Under the high dissolved oxygen and ORP (+50 to +350 mV) environment generated by the transducer(s), most ammonium ions are oxidized to nitrates by the aerobic nitrification bacteria present in the water body. However, when there is a heavy presence of organic sludge, it competes for the dissolved oxygen in the water as demonstrated by the repeated decline of dissolved oxygen to near zero in water bodies during the night. The presence of ammonium ions in the water bodies will likely persist until the sludge-induced competitive demand for dissolved oxygen begins to decline. Consequently, the continuing presence of blue-green algae will also persist until there is sufficient dissolved oxygen and/or diatoms in the water to eliminate any significant presence of ammonia and/or phosphates in the water. Seeding the water body with diatoms alone will not be effective in consistently suppressing the growth of blue-green algae.

However seeding the water body with diatoms and subjecting the water body to a magnetic field by submersing a transducer within the water body can lessen the amount of blue-green algae in that body of water, over time.

In order to affect a water body that is to be treated, the magnetic field must be able to penetrate the water under treatment at some point, from which point the domino effect travels through the water body beyond the immediate vicinity of the transducer that introduced the magnetic field to the water. This can be achieved by generating a current dependent upon a signal produced by a signal generator. A sine wave having a predetermined frequency and amplitude is used to generate a desired signal for providing a desired current to an effector or transducer which results in a magnetic field being generated about and external to the transducer emanating from the transducer. Providing a transducer that is submerged in the liquid to be affected has numerous advantages. For example, a properly sized transducer of this type energized by an alternating signal can be used to alter a property of water in a lake, a pond, sewage lagoon, water reservoir, storm water pond and similar water bodies, a container or a pipe by being introduced directly into the liquid sample to be treated. Furthermore, a transducer of this type operates at very low power in the milliwatts range to have far reaching effects. We have discovered that a properly sized transducer in accordance with this disclosure is able to affect the amount of dissolved oxygen in water tens of meters from where the transducer is placed over time. With a transducer we used, in one instance surprisingly a signal of approximately about 133 microamperes, at a frequency of about 2.5 kHz was able to generate an effect that was measurable over 40 meters away from the point of treatment in open water.

The method disclosed herein may include exposing seeded diatoms within a large body of water to a low power alternating magnetic signal using the transducer described. Depending on the residual ammonia concentration and the extent of presence of blue-green algae in the water body, the effective live diatoms concentration in the water body should be in the range of 100-10,000 medial counts per milliliter (ml). Subject to cost effectiveness considerations, the preferred live diatoms concentration would be 1,000-5,000 medial counts per ml. Nurturing a live diatoms concentration above 10,000 medial counts per ml may be preferable for water bodies requiring extensive and accelerated treatments. The high dissolved oxygen and the growing presence of the diatoms will foster a growing population of fish. The growth of the diatoms and its consumption by the fish will restore a balanced ecology for the water body. Live diatoms with nitrates and/or micronutrients may be sourced from commercial suppliers, such as, Lake Savers (http://lake-savers.com/our-solution/repair/), Nualgi Ponds (https://nualgiponds.com/), etc.

The body of water can be pretreated by first providing the low power signal to the water well in advance of seeding, and continuing to provide the signal for a duration of time after seeding takes place.

Alternatively, if there is an absence of fish in the water body and the dissolved oxygen concentration is below 3 milligram per litre (mg/l), the body of water is preferably first treated by a transducer energized with a low power signal as described above, until the dissolved oxygen level is consistently above 3 mg/l before added live diatoms are introduced. With the continuing application of the low power signal, the preferred dissolved oxygen level should be consistently above 5 mg/l and the ORP consistently above +150 mV. After the seeding of live diatoms and when the live diatoms concentration is at least 1,000 and preferably 5,000 medial counts per ml or higher, native fish may be introduced into the water body to maintain an ecological balance.

In another embodiment, the dissolved oxygen in the water body may be 5 mg/l. The transducer with the low power signal should still be deployed shortly before or after the seeding of live diatoms into the water body to maintain an ORP consistently above +150 mV and to "activate" the live diatoms and the nitrification bacteria.

In a waste water lagoon where there is a continuing input of nutrients, the application of the transducer with the low power signal may be continued to maintain a high dissolved oxygen level above 3 mg/l, an ORP above +150 mV and a live diatoms concentration above 1,000 medial counts per ml.

If during the treatment process, the live diatoms concentration should fall below 1,000 medial counts per ml, another seeding of live diatoms into the water body may be undertaken with the objective of consistently maintaining a live diatoms concentration of 2,000 to 5,000 medial counts per ml in the water until the targeted residual ammonia concentration and the desired control of blue-green algae have been accomplished.

In another embodiment, if the live diatoms concentration of the targeted water body is above 5,000 medial counts per ml, applying the low power signal alone without further live diatoms seeding may be adequate to achieve the targeted residual ammonia concentration and control of the blue-green algae.

If the targeted water body is covered by a solid sheet of ice, the deployment of the low power signal may be accompanied by an underwater air diffuser to provide an adequate source of oxygen to raise the dissolved oxygen level and the associated ORP in the water to the preferred dissolved oxygen levels above 5 mg/l and the ORP above +150 mV.

In accordance with the present disclosure, a robust living aquatic environment may be maintained by using an alternating magnetic signal in a body of water to generate high dissolved oxygen and ORP across a large water surface in combination with the simultaneous seeding of diatoms and the addition of small amount of nitrates and micronutrients, if warranted, to promote the growth of the diatoms and to suppress the germination of spores of blue-green algae. A simultaneously healthy native fish population will help maintain the desirable ecological balance of the water body.

In summary, we have found that by providing one or more properly designed transducers we are able to affect physicochemical properties of water at least 150 meters away from where the effector is placed and submerged in a large body of water irrespective of the conductivity of the water. Furthermore, this can be done using a very low power signal that can be energized from a solar panel with accompanying battery for energy storage. We believe that doing this in combination with seeding a body of water with diatoms and, if warranted, small amount of nitrates, micronutrients and a population of fish native to the area, may have a profound effect and can significantly lessen the presence of residual ammonia and cyanobacteria present in a lake, pond, stream or lagoon.

In one embodiment, the transducer and signal generator described heretofore is used to separate different constituents in an emulsion where one is a polar liquid. Oil-in-water is one of many emulsions that this disclosure relates to. Generally, however, this disclosure relates to separation of a polar and non-polar liquid, which form an emulsion.

Removal of oil from oil-in-water emulsions is an important process in oil fields and refineries. When compared to methods, such as chemical de-emulsification, gravity or centrifugal settling, pH adjustment, filtration, heat treatment, membrane separation, and the like, methods using electric fields have been considered attractive because they have the potential for increasing throughput, saving space, and reducing operating costs for many water-removal applications. The use of electric fields for separating water from water-oil mixtures of crude oil was first demonstrated in 1911, and numerous studies have been conducted more than a century for optimizing the process and expanding on the original idea. Separation of oil from water is known using magnetic fields whereby particulate matter having magnetic properties is added to the emulsion, binds to the oil, and a magnet is used to pull these along with oil from the water. Although some of these electrical/magnetic ideas may have some benefit, very few of them have been demonstrated to be cost effective for commercialization. There is significant room for improvement in the field of separation of emulsion constituents.

In one embodiment, two transducers separated by a distance of approximately 1 meter between them are fixed on the mixing chamber inside wall opposite from the inlet port of the chamber at or about 10 cm from the bottom of the mixing chamber.

In one embodiment, one or more transducers with aligned frequencies, phase, amplitudes may be fixed in a conventional separator chamber on the inside wall near the inlet port of the separator chamber, such as a dissolved or dispersed air flotation unit, to allow the magnetic field to change the physicochemical properties, such as, a reduction of the viscosity of the polar liquid to achieve higher settling/rising velocity of the non-polar coalesced droplets to achieve accelerated separation.

In the case of the dissolved air flotation unit, the separation is particularly slow because very fine air bubbles precipitate out of solution and attach themselves to the non-polar liquid particles, which tend to rise very slowly. The magnetic field affecting properties of the liquid as disclosed herein may provide more buoyancy and a speedier ascent of non-polar particles.

The method disclosed herein may also lower the viscosity of the polar liquid. This lower viscosity will permit the coalesced non-polar liquid particles and/or the air bubbles in a dispersed air flotation unit to ascend faster through the polar liquid and accelerate the separation.

In this embodiment, the method will increase the processing capacity of both the dissolved air flotation unit and the dispersed air flotation unit.

In another embodiment, a transducer placed inside a pipe elbow near the inlet port of an API oil/water separator will impose the specified magnetic field on the emulsion flowing past the transducer. The treatment effect may expand and persist in the polar liquid as the emulsion flows gently through the plates inside the API oil/water separator. The lower viscosity of the magnetically treated polar liquid may encourage more rapid migration of the non-polar liquid droplets towards the plates in the API oil/water separator to result in a more speedy separation and a higher processing capacity of the separator.

In another embodiment of the method, in the process of separating milk fats from raw milk which is an aqueous emulsion of milk fats, a transducer placed inside a pipe elbow near the inlet port of a centrifuge may impose the specified magnetic field on the raw milk flowing past the transducer. The treatment effect may expand and persist in the polar liquid as the milk is subjected to the centrifugal force inside the centrifuge. The lower viscosity of the magnetically treated polar liquid may encourage more rapid migration of the non-polar liquid droplets (cream) towards the centre of the centrifuge to result in a more speedy separation and a higher processing capacity of the separator. Alternatively, this method may permit a lower rotational speed of the centrifuge with a resulting lower capital cost and operating cost in the separation of cream from raw milk.

In order to affect an emulsion that is to be treated, the magnetic field should be able to penetrate the polar liquid under treatment at some point, from which point the effect of magnetically affected polar molecules migrates through the polar liquid beyond the immediate vicinity of the transducer that introduced the magnetic field to the emulsion. Therefore a change in property such as surface tension reaches a great distance through this domino effect. Affected water molecules affect other nearby water molecules and this surprisingly continues outward for some distance. This can be achieved by generating a current dependent upon a signal produced by a signal generator. A sine wave having a predetermined frequency and amplitude is used to generate a desired signal for providing a desired current to a transducer which results in a magnetic field being generated about and external to the transducer emanating from the transducer. Providing a transducer that is submerged in the liquid to be affected has numerous advantages. Treating an emulsion in a smaller containment vessel is practicable.

Another embodiment of this disclosure relates to using the transducer described heretofore to lessen the drying time in an industrial process.

The production capacity of a Fourdrinier paper machine is limited by the water drainage rate at the Wet End, the rate of flow of the water from the paper sheet to the felt in the Wet Press Section and the rate of vaporization of the water in the Drying Section. The modified characteristics of the magnetically treated water permit a much more rapid drainage of the water from the pulp slurry which is fed by gravity from the Headbox through a Slice at or about a consistency of 0.1-0.4% solids onto the rapidly moving (200-2,500 m/min) wire mesh of the Forming Section of the paper machine. The sheet consistency would be approximately 25% solids when the sheet exits the Forming Section and enter the Wet Press Section from which the sheet will exit at a consistency of approximately 40-55% solids. The paper sheet will exit the subsequent Drying Section with a moisture content of approximately 2-12%. The higher equilibrium partial pressure and the slightly lower heat of vaporization of the magnetically treated water in the sheet may permit a more rapid drying rate with lower energy consumption.

In one embodiment, one or more transducers with aligned frequency, phase and amplitude as described heretofore, are placed in the White Water wire pit on the walls and near the exit port leading to the suction port of a fan pump which circulates the White Water back to the Forming Section of the paper machine. One or more transducers with aligned frequency, phase and amplitude are placed near the respective exit ports of the Whitewater Chest and the Headbox to provide maximum exposure of the specific magnetic field to the White Water and the pulp slurry being circulated at the Forming Section. It is preferable that all the transducers are synchronized to produce electrical signals alternating with the same frequency, phase and amplitude. It is preferable that the respective frequency, phase and amplitude of the different sets of transducers in this process are substantially aligned. Minor misalignments may diminish the targeted treatment impacts on the process.

Through operational optimization, the number of transducers may be increased or decreased to achieve the most desirable cost effectiveness.

In another embodiment, the transducer may be placed through the piping elbows in the Forming Section as a replacement or in addition to the transducer placements in the tanks. In one embodiment, if more than one transducer is placed inside a tank, the transducers are disposed on opposite walls or corners of the tank.

Depending on the specific configurations of a paper machine, the production capacity increase with magnetic field treatment of the white water in the Forming Section and the paper sheet in the subsequent processing sections is expected to be approximately 5-30%.

The flow rates of different drying operations span a wide range, from paper making at the high end to pharmaceuticals at the low end. The liquid phase may include but is not limited to water, alcohols and many different polar and non-polar solvents. The final product may include sheets of paper, boards, pulps, plastics, automotive coatings, etc., amorphous particles or powder; grains, corn, diced vegetables; strings, e.g. noodles; etc. All of these require drying in their manufacture.

Furthermore, in accordance with the method disclosed herein, multiple transducers with a combination of frequency, phase, amplitude and separation distance may be placed so as to achieve changes of a property of a polar liquid without the addition of chemicals.

The polar liquid may form a river, lake, pond, lagoon, or other body of water. Applying the alternating electrical current to the transducer may result in an increase in dissolved oxygen or other dissolved gasses within the polar liquid. Diatoms may be added to the polar liquid before or concurrently with energizing the transducer, so as to lessen cyanobacteria, algal blooms, ammonia, phosphates or total nitrogen in the polar liquid over time.

A polar liquid treated by the transducer(s) may be used for aquaculture, in particular, for growing aquatic animals, such as fish or shrimp. Optionally, diatoms, oxygen, and/or air may be added to the polar liquid. We believe that the method disclosed herein is beneficial in fish and/or shrimp farming. Typically shrimp farming is done in large ponds and these ponds often need to be dredged after a period of time due to fish/shrimp waste settling on the bottom of these ponds.

An aspect of this disclosure relates to fish and shrimp farming. The biochemical process of digesting fish wastes in-situ is not that different from that for human sewage. Nevertheless, fish waste is often characterized by the ingredients in the fish feed. Any undesirable contaminants in the fish feed, e.g. heavy metals, inorganic chemicals, will show up in the fish wastes. Obtaining information related to the inorganic chemicals, including heavy metals, chlorides and sulfates, in the fish feed and the fish wastes to ensure that the in-situ waste digestion process would not become a pathway for the accumulation of inorganic chemicals, especially heavy metals, in the water in the fish pond can be useful.

The assertion that fish would feed on fish waste is scientifically dubious, especially if fish feed pellets are available. The observation may be a confusion with the fish trying to retrieve fish feed pellets buried under the accumulated fish wastes. Consequently, the growth of the fish will be inhibited if a large portion of the fish feed, especially those in pellet form, is buried under a thickening blanket of fish waste.

Ammonia, if allowed to accumulate from the continuing discharge of the fish wastes, at higher concentration will reduce the health resilience of the fish population. Using our transducer with a signal of the appropriate frequency and amplitude may help to increase the dissolved oxygen (DO) in the water not only for the fish or shrimp but also for the aerobic bacteria that will digest the fish or shrimp wastes. The elevated oxidation-reduction potential (ORP) and the growing presence of the aerobic nitrification bacteria, will drive the chemical equilibrium in the water from ammonia to nitrates which will encourage the growth of phytoplanktons and zooplanktons, both of which are desirable food for the fish population. The declining ratio of fish feed to fish growth weight may be an additional benefit in the deployment of the transducers in fish ponds. The most productive water in the fish pond is not water with high clarity. A slightly brown or greenish water populated with phytoplanktons and zooplanktons is more healthy and beneficial for the growth of fish and shrimps.

We believe that that fish will grow faster in the presence of our energized transducer. However, the pH and the concentrations of inorganic chemicals in the water may be monitored regularly to avoid an elevated concentration of dissolved solids, e.g. sulfates and chlorides, originated from the fish feed. If the "total dissolved solids" in the water is observed to continue to rise during the in-situ digestion of the fish wastes in the presence of the energized transducer, a program of regularly bleeding a small portion of the water and replacing it with fresh sterilized water would need to be instituted to maintain a healthy growth environment for the fish population. The amount of water bleed will be determined by the rate of chemicals accumulation in the water. Preferably, the water being replenished would be sterilized using ultraviolet or hydrogen peroxide. Chlorinated chemicals for water sterilization should be avoided to minimize the introduction of chlorinated organics into the water.

An alternative to bleeding the pond water regularly, especially if heavy metal contamination is an on-going concern, selected aquatic plants could be planted along the shoreline of the fish pond to remove the heavy metal and accumulated inorganic chemicals through the absorption by and growth of the aquatic plants. These aquatic "forest" would provide a spawning ground for some species of fish.

If the fish species being raised require a continuing supply of live feed fish, the quality of the supply chain should be rigorously monitored to avoid the inadvertent introduction of disease and chemicals from a contaminated feed fish stock.

The benefit of using our transducer is multifold. There is an increase in oxygenation of the water due to the gas mass transfer rate across the air water barrier which assists in fish/shrimp growth, and there is less requirement for draining and cleaning these fish/shrimp ponds.

In one embodiment, the ALPIM devices are used for treating a body of water of sewage, wherein the polar liquid has added diatoms. Results of treatment may include reduction of undesired pathogens, enhanced aerobic microbe population, digestion of suspended solids and sludge, displacement of anaerobic microbes and the attendant foul odors, etc. The body of water may be a lake, a river, an industrial lagoon, or an ocean. Oxygen or air may be added to the polar liquid before or concurrently with energizing the transducer. The oxygen or air is provided in the form of bubbles or by mechanical agitation of the polar liquid. Alternatively or complementary to the addition of oxygen or air, diatoms may be added to the polar liquid. Our treatment enhances the ability of the water to absorb gasses in bubbles. The method could include the use of the transducer described herein and a bubbler or aerator to enhance oxygen absorption. Also, by treating the water with the transducer, gasses which naturally bubble up from the bottom may be more readily absorbed into the water.

In one embodiment, the ALPIM device is used for pretreatment of a polar liquid before drip irrigation, desalination, or aquaculture. The drip irrigation may be assisted by the method disclosed herein, and include elimination of clogging by pretreatment of the water through various mechanisms; settlement of debris, digestion of debris, maturing the biological matter (wet composting) so that they do not grow in the drip irrigation system. Additionally, pathogens may be eliminated by aerobic processing of the water, and the agronomic value of the liquid may increase by changing the nutrients within the liquid and making them more readily available.

The transducer described heretofore, energized with an alternating current of a preferred frequency and amplitude, can change the property of a body of water, such that the water after treatment has commercial advantages, at a fraction of the cost and energy, over most other systems that attempt to clean or filter a same body of water. In our system, the water itself is not simply filtered removing unwanted matter there within. In contrast, our transducer in operation may convert harmful bacteria and harmful algae into "liquid compost", leaving micronutrients in the water. After treating the body of water, it can be pumped or allowed to flow through a manifold/conduits to irrigation systems, most importantly drip irrigation systems. This may lessen or eliminate clogging by pretreatment of the water through various mechanisms with our device and allow settlement of debris, digestion of debris, maturing the biological matter (wet composting) so that heavy particle composted matter does not flow into the drip irrigation system. Due to the aerobic enhancement that may occur using our transducer, pathogens are suppressed via aerobic processing that occurs.

By using our transducer, the higher gas exchange rate will ensure a high level of dissolved oxygen (DO) in the water. The high DO will suppress the growth of pathogens, most of which are anaerobic species, e.g. *E-coli, Salmonella*, etc., in the water. We believe that the alternating magnetic field provided by the method disclosed herein has an effect of reducing a concentration of phosphates, farm fertilizer run-offs, suspended solids, facultative bacteria, coliform, algae, zooplanktons, pests, *Daphnia*, or mosquito larvae.

The high DO and the high oxidation reduction potential (ORP) will encourage the chelation of metals in solution, including iron and phosphates, and render them less available for the growth of bacteria, phytoplanktons and zooplanktons in the water in the irrigation tubes. We believe that the lower water surface tension, if effected, will make it more difficult for particles, living or otherwise, to attach to the inner surface of the irrigation tubes, and the lower water viscosity, if effected, will accelerate the settling of suspended particles, living or otherwise, in the bulk water in the reservoir, resulting in a lower concentration of suspended solids in the water being distributed through the irrigation tubes. The higher DO in the water distributed through the irrigation tubes will help to invigorate the microbial communities in the soil. These conditions will stimulate the nitrification process and the wet composting of organic matters in the soil. More healthy growth of plant root systems will result.

Another advantage of using our transducer as a pretreatment of water before allowing that water to flow through a drip irrigation system is not just that clogging of the drip irrigators is lessened or avoided, but another advantage is realized in the availability of processed liquid composting by harvesting the settled rich compost at the bottom of a lake, lagoon or containment vessel.

In other words, drip irrigation systems, desalination systems, or aquaculture systems may use polar liquid pretreated using the following method. A transducer comprising an electrically conductive solenoidal coil is disposed at least partially within the polar liquid, wherein the coil is formed of a plurality of loops each having an interior, the loop interiors forming an interior of the coil, and wherein the polar liquid is substantially prevented from penetrating the interior of the coil. An alternating electrical current is applied to the coil so as to produce an alternating magnetic field about the coil, wherein a portion of the alternating magnetic field penetrates the polar liquid and the alternating electrical current has a frequency and a amplitude such that the alternating magnetic field has an effect on the polar liquid which changes a property of the polar liquid at a distance of at least 5 meters from the transducer. The property may be gas exchange rate, surface tension, viscosity, freezing point, or partial vapor pressure. The treated liquid is then provided, or allowed to flow, though pipes or conduits into a drip irrigation system, or a desalination system, or an aquaculture system. The pretreatment may be performed to a liquid which forms part of a river, an ocean, a lake, a pond, or an industrial lagoon. The liquid may be water, or sewage, etc.

Advantageously, the method disclosed herein may be practiced in open bodies of water, or sewage, or other liquids, including lakes, lagoons, rivers, channels, ponds and oceans. Industrial applications include columns, tanks, industrial ponds and pipelines.

The invention claimed is:

1. A system for providing an alternating magnetic field to a polar liquid for changing a property thereof, or for changing a biological response from biological material within the polar liquid, comprising a first at least partially immersible (ALPIM) device comprising:

a first signal generator for generating a first alternating electrical current; and, a first transducer for immersing into the polar liquid, comprising:

an electrically conductive solenoidal coil for coupling to the first signal generator for providing the alternating magnetic field in response to the first alternating electrical current, the electrically conductive solenoidal coil formed of a plurality of loops each having an interior, the loop interiors forming an interior of the electrically conductive solenoidal coil, wherein at least 65% of the interior of the electrically conductive solenoidal coil is not accessible by the polar liquid when the first transducer is immersed in the polar liquid, and two ferromagnetic end pieces, one at each end of the electrically conductive solenoidal coil transverse thereto and electrically isolated therefrom, for shaping a portion of the alternating magnetic field external to the electrically conductive solenoidal coil and penetrating the polar liquid when the system is immersed in the polar liquid and operational.

2. A system as defined in claim 1, comprising a ferromagnetic core within the interior of the electrically conductive solenoidal coil, electrically isolated therefrom.

3. A system as defined in claim 2, wherein the two ferromagnetic end pieces are magnetically coupled to the ferromagnetic core or integral therewith.

4. A system as defined in claim 3, wherein each of the two ferromagnetic end pieces has a diameter of at least half of a height of the electrically conductive solenoidal coil.

5. A system as defined in claim 3, wherein the two ferromagnetic end pieces are planar and normal to the electrically conductive solenoidal coil.

6. A system as defined in claim 5, wherein the two ferromagnetic end pieces are round pieces centered at the electrically conductive solenoidal coil.

7. A system as defined in claim 6, wherein a cross-section of the electrically conductive solenoidal coil is a circle.

8. A system as defined in claim 1, wherein the interior of the electrically conductive solenoidal coil is filled with a non-magnetic material or under a vacuum.

9. A system as defined in claim 1, wherein the first transducer comprises a non-ferromagnetic core disposed within the interior of the electrically conductive solenoidal coil and extending beyond ends of the electrically conductive solenoidal coil by at least 10% of a height of the electrically conductive solenoidal coil.

10. A system as defined in claim 1, comprising a sealed container surrounding the electrically conductive solenoidal coil, wherein the container allows the alternating magnetic field to pass therethrough.

11. A system as defined in claim 10, wherein the container extends beyond ends of the electrically conductive solenoidal coil by at least 10% of a height of the electrically conductive solenoidal coil for preventing portions of the alternating magnetic field at the ends of the electrically conductive solenoidal coil to penetrate the polar liquid.

12. A system as defined in claim 3, wherein the first signal generator is configured so that the first alternating electrical current is a periodic current having a first amplitude and a first frequency.

13. A system as defined in claim 12, wherein the first frequency is 5 kHz or less.

14. A system as defined in claim 1, wherein at least 80% of the interior of the electrically conductive solenoidal coil is not accessible by the polar liquid when the first transducer is immersed in the polar liquid.

15. A system as defined in claim 14, wherein the interior of the electrically conductive solenoidal coil is not accessible by the polar liquid when the first transducer is immersed in the polar liquid.

16. A system as defined in claim 12, wherein the first signal generator is configured so that the first amplitude of the first alternating electrical current has a root mean square less than 3 amperes.

17. A system as defined in claim 16, wherein the first signal generator is configured so that the first amplitude of the first alternating electrical current has a root mean square less than 500 microAmperes.

18. A system as defined in claim 17, wherein a root mean square of the first amplitude of the first alternating electrical current is less than 50 microAmperes.

19. A system as defined in claim 12, wherein the first signal generator is configured so that the first amplitude of the first alternating electrical current has a root mean square (rms) of 100±15 microAmperes and the first frequency of the first alternating electrical current is 2500±10 Hz, or the amplitude of the first alternating electrical current has an rms of 99±15 microAmperes and the first frequency of the first alternating electrical current is 2700±10 Hz, or the first amplitude of the first alternating electrical current has an rms of 140±15 microAmperes and the first frequency of the first alternating electrical current is 4000±10 Hz.

20. A system as defined in claim 12, wherein a feedback loop is provided to control the first alternating electrical current in dependence upon a measured parameter.

21. A system as defined in claim 12, wherein the first signal generator is configured to provide a plurality of electrical signals having predefined frequencies, and wherein the system utilizes a frequency from the plurality of frequencies.

22. A system as defined in claim 12, wherein the first ALPIM device comprises floating means for maintaining the transducer at a predefined level relative to a surface of the polar liquid when immersed therein.

23. A system as defined in claim 12, wherein the first ALPIM device comprises an antenna for wireless communication.

24. A system as defined in claim 12, comprising a second ALPIM device comprising a second transducer for immersing into the polar liquid and a second signal generator for coupling with the second transducer, wherein in operation a second alternating electrical current from the second signal generator is provided to the second transducer, the second alternating electrical current having a second frequency.

25. A system as defined in claim 22, wherein the first and second signal generators are configured so that the first alternating electrical current and the second alternating electrical current are offset in phase for controlling a change in the property of the polar liquid or the biological response from the biological material in the polar liquid.

* * * * *